United States Patent [19]

Raymond

[11] 4,420,120
[45] Dec. 13, 1983

[54] CASSETTE, FOR SHEET PHOTOGRAPHIC MATERIALS

[76] Inventor: Gary E. Raymond, 755 S. Rainbow Dr., Hollywood, Fla. 33021

[21] Appl. No.: 387,865

[22] Filed: Jun. 14, 1982

[51] Int. Cl.$^3$ .............................................. G03B 1/04
[52] U.S. Cl. .................................. 242/71.7; 242/71.1
[58] Field of Search .................. 242/71.1, 71.7, 55.53, 242/71

[56] References Cited

U.S. PATENT DOCUMENTS

| 2,172,255 | 9/1939 | Nagel | 242/71.1 |
| 2,662,696 | 12/1953 | Nerwin | 242/71.1 |
| 3,104,846 | 9/1963 | Ringle | 242/71.1 |
| 3,128,058 | 4/1964 | Ringle et al. | 242/71.1 |
| 3,945,584 | 3/1976 | Mangan | 242/71.7 X |

Primary Examiner—John Petrakes
Attorney, Agent, or Firm—Bernard J. Murphy

[57] ABSTRACT

The cassette comprises a housing formed of a pair of mating shells which join to define a cylindrical chamber therewithin, in which chamber to confine sheet photographic materials, such as negative stock, emulsified paper, and the like. The shells are hingedly joined together, and have latches which fasten them together in light-sealing engagement. A trough, formed of two mating parts, is provided for the paying-out of the photographic materials therethrough from the chamber. One of the mating parts is a fixed portion of one of the shells, and the other thereof is hingedly joined to the other of the shells. The mating parts of the trough also have latches which fasten them together.

15 Claims, 9 Drawing Figures

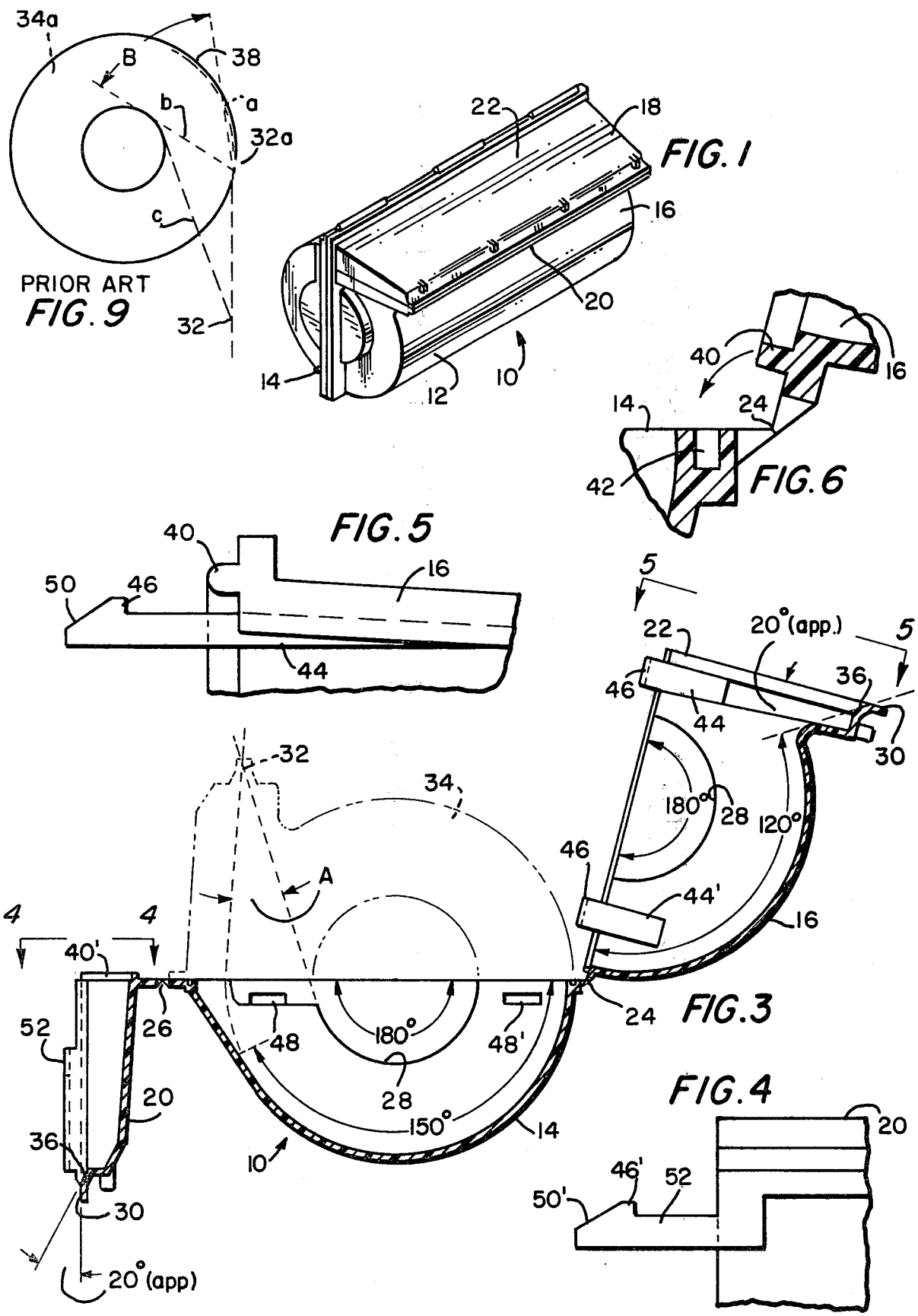

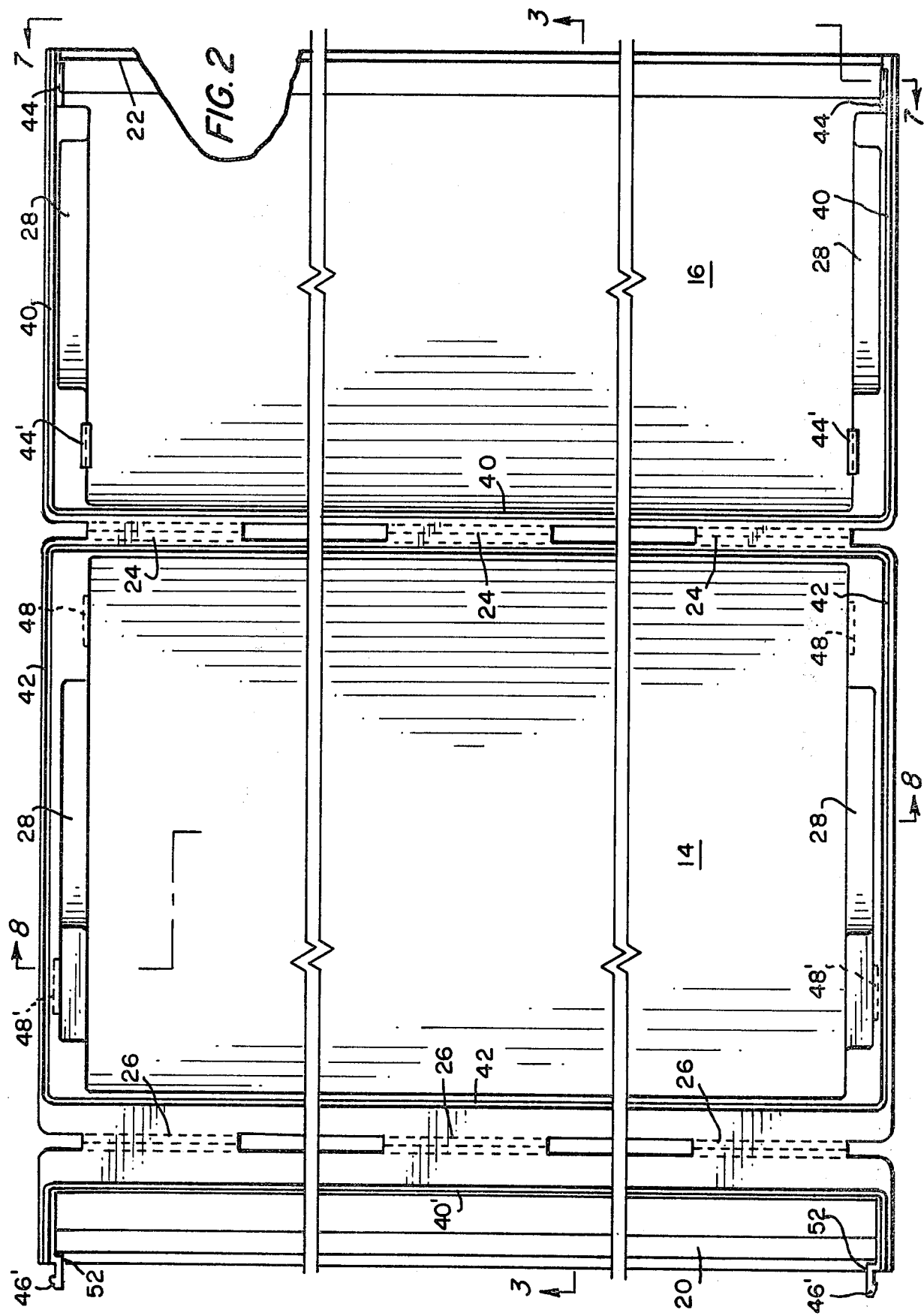

CASSETTE, FOR SHEET PHOTOGRAPHIC MATERIALS

This invention pertains to cassettes, such as are used in which to store sheet materials, typically in roll form, and from which to pay-out the materials as required, and in particular to a novel cassette of the aforesaid general type for sheet photographic materials, such as negative stock, emulsified paper, and the like.

Cassettes of the type to which the invention pertains and which are known in the prior art, generally have a peripheral wall, and end walls, which define a cylindrical chamber therewithin, and an opening in the peripheral wall through which to extract or pay-out the therein stored materials. Also, the prior art cassettes have a removable end wall, in order that roll materials may be inserted thereinto, the end wall being returned and secured to the peripheral wall. Such known cassettes have disadvantages which inhibit their use, and subject the materials to possible damage.

When materials, such as negative stock and emulsified paper, are payed-out from a cassette chamber in which the pay-out opening is formed in the peripheral wall thereof, the initial lengths of materials are extracted along a plane or planes which are substantially tangent to the inner surface of the peripheral wall. However, as the roll of material within the cassette proceeds to diminish in diameter, then the material must describe an exaggerated angle and turn, sharply, upon the underlying edge of the pay-out opening. Hence, the material can be scored or abraded, rendering it unusable.

Roll materials of paper, or the like, commonly are provided on a hollow shaft of cardboard, or the like. Now, cassettes which have a removable end wall need to have means, formed in the end wall, for journalling the hollow shaft—in order that the material may be freely extracted. If the paper is not light-sensitive, it is not too difficult to align the journalling means with the inside diameter of the hollow shaft, to insure the proper rotatable mounting of the shaft, and to enable the return and securing of the end wall to the peripheral wall of the cassette. However, if the paper is light-sensitive, or is negative stock, uncommon difficulty attends the attempt to align the end wall with the hollow shaft, as the ministration needs to be done in darkness.

In light of the aforesaid difficulties, it is an object of this invention to set forth a cassette for sheet photographic materials which is facile of use, and which avoids damaging the materials during pay-out thereof therefrom.

It is particularly an object of this invention to set forth a cassette, for sheet photographic materials, such as negative shock, emulsified paper, and the like, comprising a housing having an elongate central axis; said housing having means defining a substantially cylindrical chamber therewithin; said means comprising a peripheral wall circumscribing said axis on a given radius and extending-through not less than two hundred and seventy degrees of arc; said housing further having an opening formed therein along a plane which is substantially tangential to said peripheral wall; and wherein said opening subsists at a distance from said axis which is greater than said given radius.

Further objects of this invention, as well as the novel features thereof, will become more apparent by reference to the following description, taken in conjunction with the accompanying figures, in which:

FIG. 1 is an isometric projection of the novel cassette, according to an embodiment of the invention;

FIG. 2 is a plan view of the cassette, looking into the shell halves thereof with the latter fully, hingedly opened;

FIG. 3 is a cross-sectional view taken along section 3—3 of FIG. 2 in which, however, one of the shell halves is partially, hingedly elevated (from its attitude in FIG. 2);

FIG. 4 is a fragmentary view of one of the mating parts of the trough taken along line 4—4 of FIG. 3;

FIG. 5 is a fragmentary view of the other of the mating parts of the trough taken along line 5—5 of FIG. 3;

FIG. 6 is a detail view, in cross-section, of the hinged joint of the shell halves;

FIG. 9 is a line illustration of a prior art type of cassette.

FIGS. 2, 7 and 8 are axially discontinuous, only for space accommodation, and are in enlarged scale over the scale of FIG. 3; FIGS. 4, 5 and 6 are considerably enlarged over the scale of FIG. 3; and FIG. 1 is in roughly half the scale of FIG. 3.

Figure 7:
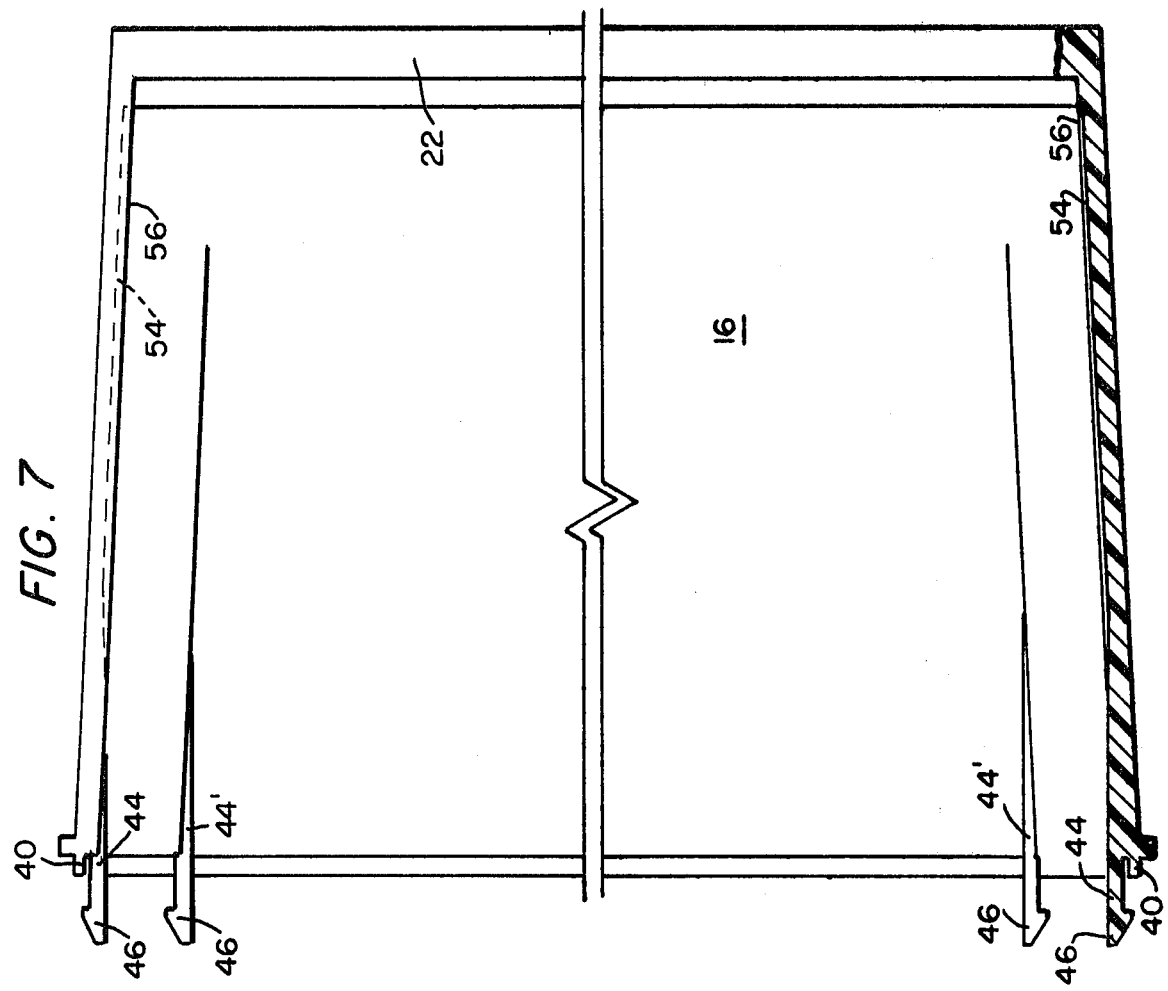
FIG. 7 is a cross-sectional view taken along section 7—7 of FIG. 2.
Figure 8:
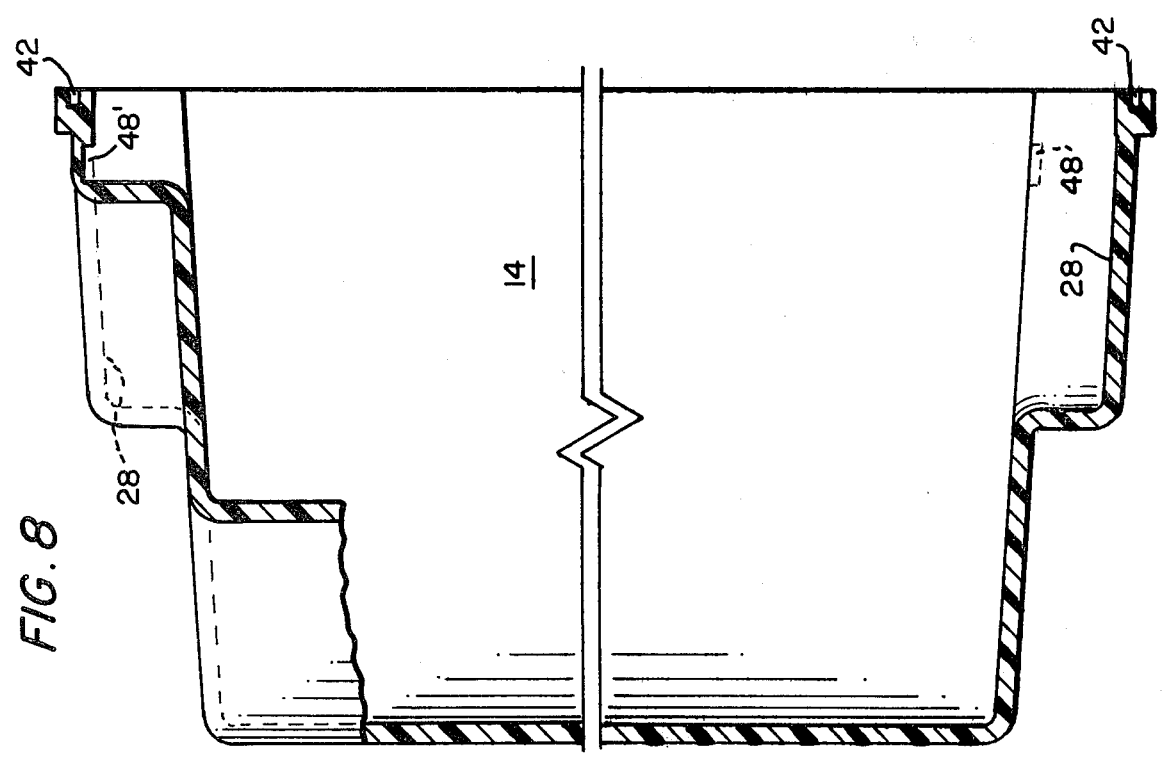
FIG. 8 is a cross-sectional view taken along section 8—8 of FIG. 2.

As shown in the figures, the novel cassette 10 comprises a housing 12 formed of a pair of shells 14 and 16, and a trough 18 formed of a pair of mating parts 20 and 22. As can be perceived from FIGS. 1 and 3, together the shells 14 and 16 define a peripheral wall which circumscribes the axial center of the cassette 10 on a given radius which extends through not less than two hundred and seventy degrees of arc. The shells and trough are formed of plastic, in this embodiment of the invention. The shells 14 and 16 are coupled together by means of plastic hinges 24, and trough mating part 20 is coupled to shell 14 by means of plastic hinges 26. Hinges 24 are formed along a first axial edge of shell 14; hinges 26 are formed along a second, opposite axial edge of shell 14. Accordingly, as shown in FIG. 3, these hinges 24 and 26 are one hundred and eighty degrees of arc therebetween. Opposite ends of the shells 14 and 16 have substantially semicircular recesses 28 formed therein by outwardly projecting portions of the end walls thereof. Said recesses 28 cooperate to define circular journals for a roll of material.

In FIG. 3, in dashed outline, is shown a view of the cassette 10 when the shell 16 is hingedly fully rotated (counterclockwise, in FIG. 3) to close upon and mate with shell 14, and the mating part 20 of the trough 18 is hingedly fully rotated (clockwise) to close upon and mate with mating part 22. Mating parts 20 and 22 have axial-extending surfaces 30 which, as shown in the dashed outline of FIG. 3, come into mutual alignment and, while not readily discernible in FIG. 3, come to near contacting engagement. A narrow, axially-extended opening 32 is defined between surfaces 30 through which to extract or pay-out material from within the cylindrical chamber 34 formed by the mating of the shells 14 and 16.

In FIG. 3, dashed lines drawn from tangency with the inside diameters of the shell 14 and the recess 28 therein traverse at the opening 32 and define therebetween an angle "A" of not more than approximately twenty degrees of arc. Also, the surfaces 36 which immediately adjoin the surfaces 30 are disposed at angles of approximately twenty degrees of arc from the planes in which surfaces 30 subsist. By this arrangement, together with the disposition of opening 32 at a distance from the axial center of the cylindrical chamber 34 which is greater than the radial distance of the circular, peripheral wall surfaces of shells 14 and 16, the pay-out of material from the cassette can be accomplished with less risk of damge to the material. This can be more fully appreciated by reference to FIG. 9. In the latter figure, a prior art cassette 38 defines a chamber 34a therewithin, and has an opening 32a through which to extract roll material. A first dashed line "a" denotes the substantially tangential travel of material from the chamber 34a. Hence, with a full roll of material in the chamber 34a, the first lengths of material withdraw without suffering any scoring or abrasion. However, as the diameter of the roll diminishes, and the material is being payed-out from deep within the chamber 34a, it must describe the path denoted by the dashed line "b", and execute an abrupt, exaggerated turn upon the lowermost edge of the opening 32a. This invites scoring, abrasion and tearing of the material. According to my teaching, with the opening 32 of my cassette 10 at a great distance, i.e. half again the radial distance of the inner arcuate walls of shells 14 and 16, all the material can be payed-out from the chamber 34 within a pay-out angle not exceeding approximately twenty degrees of arc. In contrast, the pay-out angle "B" of the prior art cassette 38 is in excess of forty-five degrees of arc. For purposes of comparison, FIG. 9 has an index reference for opening 32 (of cassette 10) and a pay-out line "c" representative of the most severe angle of pay-out for cassette 10.

Shell 16 has a raised rib 40 about three sides thereof, which light-sealingly engages a channel 42 formed in corresponding three sides of shell 14, when the two shells are closed upon each other. In addition channel 42 continues along the fourth side of shell 14, for light-sealing engagement with a raised rib 40' which extends from three sides of trough mating part 20. The short side lengths of rib 40' engage the thereadjacent side portions of the channel 42, when the trough mating part 20 is rotated (clockwise) into engagement with the shell 14.

Means are provided for locking the shells 14 and 16 into mated engagement, and for locking the mating parts 20 and 22 of the trough 18 together. A pair of latch fingers 44, having hook-like terminations 46, extend outwardly from the shell 16, at opposite axial ends thereof, adjacent to the side thereof which is furtherest from the hinges 24. The latch fingers are integral with the inner wall surface of the shell thereat, and extend therefrom in parallel therewith. A second pair of latch fingers 44', likewise at opposite axial ends of the shell 16, and having hook-like terminations 46, extend outwardly from the shell 16 adjacent to the side thereof which is more proximate to the hinges 24. Latch fingers 44' each are integral with the inner wall surface thereat, which is an inboard land circumscribing the recesses 28, respectively, and each extends from its respective land-/wall surface in parallel therewith. Corresponding latch-engaging recesses 48 and 48' are formed in corresponding end wall surfaces of the shell 14, to receive the latch fingers 44 and 44', respectively. The leading ends of the hook-like terminations have diagonal surfaces 50 which enable the fingers 44 and 44' to slide upon the end surfaces of the shell 14, toward the recesses 48 and 48', causing the fingers to flex, resiliently, until the abrupt hook portion thereof passes the uppermost edges of the recesses 48 and 48'. Then, the fingers 44 and 44' snap into the recesses 48 and 48', and the shells 14 and 16 are irreversibly locked together, in light-tight security.

As noted, locking means are provided for the trough mating parts 20 and 22 also. Along a principal length of mating part 20, and extending outwardly from each side wall thereof, is an elongate latch finger 52. Each finger 52 has similar hook portions 46' like hook portions 46 of fingers 44 and 44', and diagonal surfaces 50' as well. Fingers 52 also are integral with the inner wall surfaces of the mating part 20, and extend therefrom in parallel therewith. As can be seen in FIG. 7, along a principal length of mating part 22, just inboard of the linear surfaces thereof which mate with mating part 20, i.e., the side surfaces thereof, are linear undercuts 54. The latter define linear grooves which, outboard thereof, form ribs 56. Consequently, when trough mating part 20 is rotated (clockwise) to engage mating part 22, the surfaces 50' slide upon the ribs 56 until the abrupt hook portions of the fingers 52 reach the undercuts 54. Then, fingers 52 also snap into the undercuts 54, and the mating parts 20 and 22 are irreversibly locked together in light-tight security.

In use, of course, and with great ease in a dark environment, roll material is disposed in shell 14, with the hollow shaft thereof set into the recess 28 provided therefor. A leader end of the roll material is pulled outwardly, and shell 16 is rotated counterclockwise and snapped into closure onto shell 14; recess 28 in shell 16 completes the journaling of the roll material shaft. Then, the mating part 20 of trough 18 is rotated clockwise to engage and snap into closure with mating part 22, both said parts securing therebetween the leader end of the roll material. The length of the leader end, to facilitate pay-out of the material into a camera or the like, needs to be sufficiently long to leave a portion thereof projecting from the trough 18.

While I have described my invention in connection with a specific embodiment thereof, it is to be clearly understood that this is done only by way of example and not as a limitation to the scope of my invention, as set forth in the objects thereof and in the appended claims.

I claim:

1. A cassette, for sheet photographic materials, such as negative stock, emulsified paper, and the like, comprising:
   a housing having an elongate central axis;
   said housing having means defining a substantially cylindrical chamber therewithin;
   said means comprising a peripheral wall circumscribing said axis on a given radius and extending through not less than two hundred and seventy degrees of arc;
   said housing further having an opening formed therein along a plane which is substantially tangential to said peripheral wall; and wherein
   said opening subsists at a distance from said axis which is greater than said given radius;
   said housing further has means defining a walled trough extending parallel with said axis;
   said trough has a pair of axially-extending surfaces which are in mutual alignment and in near contacting engagement;
   said opening subsists between said surfaces;

at least one of said surfaces is disposed in a given plane and has a second trough surface immediately adjoining disposed at an angle from said given plane; and said angle of said second trough surface is approximately twenty degrees of arc from said given plane.

2. A cassette, according to claim 1, wherein:

said housing comprises a pair shells hingedly joined, along a line parallel with said axis, intermediate the periphery of said peripheral wall.

3. A cassette, according to claim 2, wherein:

said shells having mutually mating edges; and said edges have means defining a light-sealing engagement therebetween.

4. A cassette, for sheet photographic materials, such as negative stock, emulsified paper, and the like, comprising:

a housing having an elongate central axis;

said housing having means defining a substantially cylindrical chamber therewithin;

said means comprising a peripheral wall circumscribing said axis on a given radius and extending through not less than two hundred and seventy degrees of arc;

said housing further having an opening formed therein along a plane which is substantially tangential to said peripheral wall; and wherein said opening subsists at a distance from said axis which is greater than said given radius;

said housing further has means defining a walled trough extending parallel with said axis;

said trough has a pair of axially-extending surfaces which are in mutual alignment and in near contacting engagement;

said opening subsists between said surfaces;

said housing comprises a pair of shells hingedly joined, along a line parallel with said axis, intermediate the periphery of said peripheral wall;

said shells have mutually mating edges;

said edges have means defining a light-sealing engagement therebetween;

one of said shells has a mating edge, as aforesaid, in which is formed a channel; and the other of said shells has a mating edge, as aforesaid, having a prominent rib for nestingly engaging said channel.

5. A cassette, according to claim 4, wherein:

said distance is approximately fifty percent greater than said given radius.

6. A cassette, according to claim 4, wherein:

said housing further has means for journalling a roll of sheet photographic material therewithin for paying-out of such material, from said chamber, along said plane, and along planes lying at acute angles, not exceeding approximately twenty degrees of arc, from said plane.

7. A cassette, according to claim 6, wherein:

said housing further has walls at opposite axial ends thereof lying substantially normal to said peripheral wall; and said end walls have circular recesses formed therein which define said journalling means.

8. A cassette, according to 4, wherein:

said trough is defined of two mating parts;

one of said mating parts is an immobile, integral portion of one of said shells; and the other of said mating parts is hingedly joined, along a line parallel with said axis, to the other of said shells.

9. A cassette, according to claim 8, wherein:

said shells, and said other mating part, are hingedly joined along lines parallel with said axis, as aforesaid, which are one hundred and eighty degrees of arc therebetween.

10. A cassette, according to claim 8, wherein:

said mating parts have means for locking the two thereof together.

11. A cassette, according to claim 10, wherein:

said locking means comprises latch means carried by at least one of said mating parts, and latch-engaging means on at least the other of said mating parts.

12. A cassette, according to claim 4, wherein:

said shells have means for locking the pair thereof together.

13. A cassette, according to claim 12, wherein:

said locking means comprises latch means carried by at least one of said shells, and latch-receiving means in at least the other of said shells.

14. A cassette, for sheet photographic materials, such as negative stock, emulsified paper, and the like, comprising:

a housing having an elongate central axis;

said housing having means defining a substantially cylindrical chamber therewithin;

said means comprising a peripheral wall circumscribing said axis on a given radius and extending through not less than two hundred and seventy degrees of arc;

said housing further having an opening formed therein along a plane which is substantially tangential to said peripheral wall; and wherein said opening subsists at a distance from said axis which is greater than said given radius;

said housing further has means defining a walled trough extending parallel with said axis;

said trough has a pair of axially-extending surfaces which are in mutual alignment and in near contacting engagement;

said opening subsists between said surfaces;

said housing comprises a pair of shells hingedly joined, along a line parallel with said axis, intermediate the periphery of said peripheral wall;

said shells have means for locking the pair thereof together;

said locking means comprises latch means carried by at least one of said shells, and latch-receiving means in at least the other of said shells;

said latch means comprises a plurality of latch fingers extending from said one shell;

said fingers having hook-type terminations; and said latch-receiving means comprises linear recesses formed in a surface of said other shell.

15. A cassette, for sheet photographic materials, such as negative stock, emulsified paper, and the like, comprising:

a housing having an elongate central axis;

said housing having means defining a substantially cylindrical chamber therewithin;

said means comprising a peripheral wall circumscribing said axis on a given radius and extending through not less than two hundred and seventy degrees of arc;

said housing further having an opening formed therein along a plane which is substantially tangential to said peripheral wall; and wherein said opening subsists at a distance from said axis which is greater than said given radius;

said housing further has means defining a walled trough extending parallel with said axis;

said trough has a pair of axially-extending surfaces which are in mutual alignment and in near contacting engagement;

said opening subsists between said surfaces;

said housing comprises a pair of shells hingedly joined, along a line parallel with said axis, intermediate the periphery of said peripheral wall;

said trough is defined of two mating parts;

one of said mating parts is an immobile, integral portion of one of said shells;

the other of said mating parts is hingedly joined, along a line parallel with said axis, to the other of said shells;

said mating parts have means for locking the two thereof together;

said locking means comprises latch means carried by at least one of said mating parts, and latch-engaging means on at least the other of said mating parts;

said latch means comprises a pair of latch edges extending along a length of said one mating part;

said latch edges having hook-like terminations; and said latch-engaging means comprises a pair of ribs extending along a length of said other mating part.

* * * * *